United States Patent
Kim

(10) Patent No.: US 10,671,477 B2
(45) Date of Patent: Jun. 2, 2020

(54) MEMORY DEVICE AND OPERATION METHOD OF THE SAME

(71) Applicant: SK hynix Inc., Gyeonggi-do (KR)

(72) Inventor: Youk-Hee Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 62 days.

(21) Appl. No.: 15/944,983

(22) Filed: Apr. 4, 2018

(65) Prior Publication Data

US 2019/0108089 A1 Apr. 11, 2019

(30) Foreign Application Priority Data

Oct. 11, 2017 (KR) .................. 10-2017-0129846

(51) Int. Cl.
*G06F 11/10* (2006.01)
*G06F 3/06* (2006.01)
*G06F 12/06* (2006.01)

(52) U.S. Cl.
CPC ........ *G06F 11/1048* (2013.01); *G06F 3/0619* (2013.01); *G06F 3/0659* (2013.01); *G06F 3/0679* (2013.01); *G06F 11/1016* (2013.01); *G06F 12/06* (2013.01); *G06F 2212/1032* (2013.01)

(58) Field of Classification Search
CPC ............ G06F 11/1048; G06F 11/1016; G06F 3/0619; G06F 3/0659; G06F 3/0679; G06F 12/06
See application file for complete search history.

(56) References Cited

U.S. PATENT DOCUMENTS

| | | | |
|---|---|---|---|
| 6,895,173 B2 | 5/2005 | Choi | |
| 7,397,714 B2 | 7/2008 | Nagai et al. | |
| 2012/0072806 A1* | 3/2012 | Tabata | G06F 11/1048 714/773 |
| 2014/0040699 A1* | 2/2014 | Kuriyama | H03M 13/1148 714/758 |

* cited by examiner

*Primary Examiner* — Shelly A Chase
(74) *Attorney, Agent, or Firm* — IP & T Group LLP

(57) ABSTRACT

A method for operating a memory device includes: receiving a first read command and a first address; reading a first read data and a first error correction code from memory cells selected based on the first address; detecting and correcting an error of the first read data using the first error correction code; storing the first address as an error detection address in an address latch circuit; storing an error-corrected bit of the first read data and a position of the error-corrected bit of the first read data in a data latch circuit; and transmitting an error-corrected first read data to an external device.

10 Claims, 4 Drawing Sheets

MEMORY DEVICE AND OPERATION METHOD OF THE SAME

CROSS-REFERENCE TO RELATED APPLICATIONS

The present application claims priority of Korean Patent Application No. 10-2017-0129846, filed on Oct. 11, 2017, which is incorporated herein by reference in its entirety.

BACKGROUND

1. Field

Exemplary embodiments of the present invention relate generally to a semiconductor memory device. More particularly, the present invention relates to a memory device, and a memory system employing an improved method of correcting data errors.

2. Description of the Related Art

In the early days of the semiconductor memory industry, quite a few original good dies obtained through a semiconductor fabrication process were free of defective memory cells. However, as the capacity of a memory device increased, it became increasingly difficult to fabricate a memory device that does not include any defective memory cells at all. At present, it may be said that there is no memory device that does not include any defective memory cells at all. To solve this problem, various methods have been used heretofore for repairing the defective memory cells. One well-known method includes repairing the defective memory cells with redundant memory cells. Another method employs an error correction code (ECC) circuit in a memory system for correcting an error that occurs in a memory cell.

During a read operation of a memory device, errors of data may be corrected by an ECC circuit, and the error-corrected data may be outputted to the an external or host device of the memory device. Although the error-corrected data are outputted to the an external or host device of the memory device, the errors (i.e., failure data) still remains in the memory cells. When the same memory cells are accessed, the same errors may occur, and often the number of the errors may exceed the error correction capacity of the ECC circuit in which case some errors may remain uncorrected.

In short, the errors of data outputted to an external device or host device of the memory device may be corrected by the ECC circuit, but the data remaining in the memory cells may still include the errors, which is problematic.

SUMMARY

Various embodiments of the present invention are directed to a memory device and a method of operating the same exhibiting improved the error correction efficiency over existing memory devices and methods.

In accordance with an embodiment of the present invention, a method for operating a memory device includes: receiving a first read command and a first address; reading a first read data and a first error correction code from memory cells selected based on the first address; detecting and correcting an error of the first read data using the first error correction code; storing the first address as an error detection address in an address latch circuit; storing an error-corrected bit of the first read data and a position of the error-corrected bit of the first read data in a data latch circuit; and transmitting an error-corrected first read data to an external device.

In accordance with another embodiment of the present invention, a memory device includes: an error correction circuit suitable for detecting and correcting an error of a read data based on an error correction code which is read during a read operation; a data latch circuit suitable for storing an error-corrected bit of the read data and a position of the error-corrected bit of the read data when an error is detected by the error correction circuit; an address latch circuit suitable for storing an address corresponding to the read data as an error detection address when the error is detected by the error correction circuit; and a comparison circuit suitable for comparing an external address with the error detection address, wherein when the comparison circuit decides that the external address is the same as the error detection address during the read operation, a bit of the read data, which is read from memory cells corresponding to the external address, at the same position as the error-corrected bit, which is stored in the data latch circuit, is replaced with the error-corrected bit.

These and other features and advantages of the present invention will become apparent to those with ordinary skill in the art to which the present invention belongs from the following description in conjunction with the accompanying drawings.

DETAILED DESCRIPTION

Figure 1:
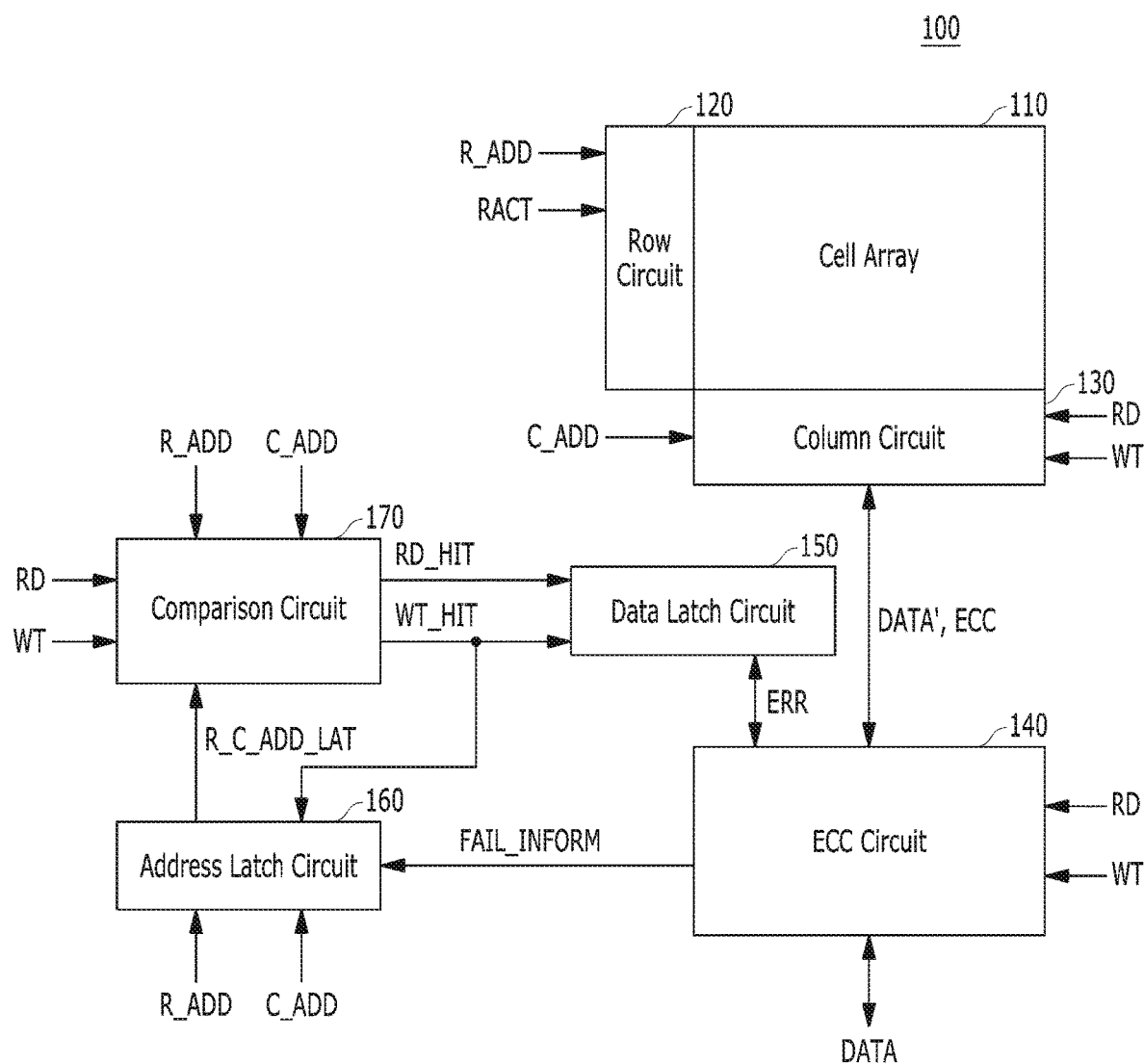
FIG. 1 is a block diagram illustrating a memory device, in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In describing the present disclosure, when it is determined that the detailed description of the known related art may obscure the gist of the present disclosure, the detailed description thereof will be omitted.

Although the terms such as first and second may be used to describe various components, the components are not limited by the terms, and the terms are used only to distinguish components from other components.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. However, it should be understood that the present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a memory device 100, in accordance with an embodiment of the present invention.

Referring to FIG. 1, the memory device 100 may include a cell array 110, a row circuit 120, a column circuit 130, an error correction code (ECC) circuit 140, a data latch circuit 150, an address latch circuit 160, and a comparison circuit 170. Herein, the memory device 100 may be one among diverse kinds of memories, such as a Dynamic Random-Access Memory (DRAM), a Phase-Change Random Access Memory (PCRAM), a flash memory and the like.

The cell array 110 may include a plurality of word lines, a plurality of bit lines, and a plurality of memory cells. Each of the memory cells may be coupled to one among the word lines and the bit lines. The memory cells may be arranged in rows and columns. The memory cells may be arranged in a two-dimensional or a three-dimensional structure.

When a row active signal RACT is enabled, the row circuit 120 may enable a word line that is selected based on a row address R_ADD among the word lines of the cell array 110. The row active signal RACT may be enabled when an active command is applied from a memory controller to the memory device 100, and the row active signal RACT may be disabled when a precharge command is applied from the memory controller to the memory device 100. The row address R_ADD may be applied from the memory controller to the memory device 100. The memory controller may be operatively coupled to the memory device 100 via a suitable memory interface to form a memory system. The memory system may be in turn operatively coupled to a host device (not shown) or an external device. Any suitable memory controller may be used without departing from the scope of the present invention.

The column circuit 130 may read a data DATA' and an error correction code (ECC) from memory cells corresponding to bit lines selected based on a column address C_ADD among the bit lines of the cell array 110 and a word line which is enabled by the row circuit 120 during a read operation performed when a read signal RD is enabled. In other words, the column circuit 130 may read the data DATA' and the error correction code from the memory cells that are selected based on the column address C_ADD and the row address R_ADD.

Also, the column circuit 130 may program the data DATA' and the error correction code from memory cells corresponding to bit lines selected based on a column address C_ADD among the bit lines of the cell array 110 and a word line which is enabled by the row circuit 120 during a write operation performed when a write signal WT is enabled. In other words, the column circuit 130 may program the data DATA' and the error correction code from the memory cells that are selected based on the column address C_ADD and the row address R_ADD.

The read signal RD may be enabled when a read command is applied from the memory controller to the memory device 100. The write signal WT may be enabled when a write command is applied from the memory controller to the memory device 100. The column address C_ADD may be applied from the memory controller to the memory device 100. The data DATA' and the error correction code may be of multiple bits. For example, the data DATA' may be approximately 128 bits, and the error correction code may be approximately 8 bits.

The ECC circuit 140 may generate the error correction code which is to be stored along with a write data DATA' based on a write data DATA which is transferred from the memory controller during a write operation which is performed when the write signal WT is enabled. During the write operation, the write data DATA and the write data DATA' may be the same.

Also, the ECC circuit 140 may correct an error of a read data DATA' based on the error correction code during a read operation which is performed when the read signal RD is enabled. The error-corrected read data DATA obtained by the ECC circuit 140 may be transferred to the memory controller. When an error is detected and corrected in the read data DATA', the ECC circuit 140 may transfer an error-corrected bit and information on the position of the error-corrected bit in the read data DATA' to the data latch circuit 150. During a read operation, when a read hit signal RD_HIT is enabled, the ECC circuit 140 may perform an error correction operation after a bit at the same position as the error-corrected bit, which is stored in the data latch circuit 150, is replaced with the error-corrected bit in the read data DATA'. In FIG. 1, 'ERR' represents information on the error-corrected bit and the position of the error-corrected bit in the read data DATA'. A failure information signal FAIL_INFORM in FIG. 1 may be enabled when the ECC circuit 140 detects an error. The failure information signal FAIL_INFORM transferred from the ECC circuit 140 to the address latch circuit 160 may indicate whether an error is detected or not.

When an error is detected and corrected by the ECC circuit 140, the data latch circuit 150 may receive and store the information ERR on the error-corrected bit and the position of the error-corrected bit in the read data DATA'. When the read hit signal RD_HIT is enabled, the data latch circuit 150 may transfer the stored information ERR to the ECC circuit 140. Also, when a write hit signal WT_HIT is enabled, the data latch circuit 150 may be reset, that is, initialized.

When an error is detected and corrected by the ECC circuit 140 during a read operation, that is, when the failure information signal FAIL_INFORM is enabled, the address latch circuit 160 may store the row address R_ADD and the column address C_ADD corresponding to the read data DATA' where the error is detected. That is, when the failure information signal FAIL_INFORM is enabled, the address latch circuit 160 may store the row address R_ADD and the column address C_ADD that are being used for the read operation, which is being performed. Also, when the write hit signal WT_HIT is enabled, the address latch circuit 160 may be reset, that is, initialized.

The comparison circuit 170 may compare the row and column addresses R_C_ADD_LAT that are stored in the address latch circuit 160 during a read operation where the read signal RD is enabled with the row address R_ADD and the column address C_ADD that are used in the current read operation, and when the row and column addresses R_C_ADD_LAT that are stored in the address latch circuit 160 are the same as the row address R_ADD and the column address C_ADD that are used in the current read operation, the comparison circuit 170 may enable the read hit signal RD_HIT. Also, the comparison circuit 170 may compare the row and column addresses R_C_ADD_LAT that are stored in the address latch circuit 160 during a write operation where the write signal WT is enabled with the row address R_ADD and the column address C_ADD that are used in the current write operation, and when the row and column addresses R_C_ADD_LAT that are stored in the address latch circuit 160 are the same as the row address R_ADD and the column address C_ADD that are used in the current write operation, the comparison circuit 170 may enable the write hit signal WT_HIT.

Hereafter, an exemplary operation of the memory device 100 is described with reference to FIGS. 2 to 4.

Figure 2:
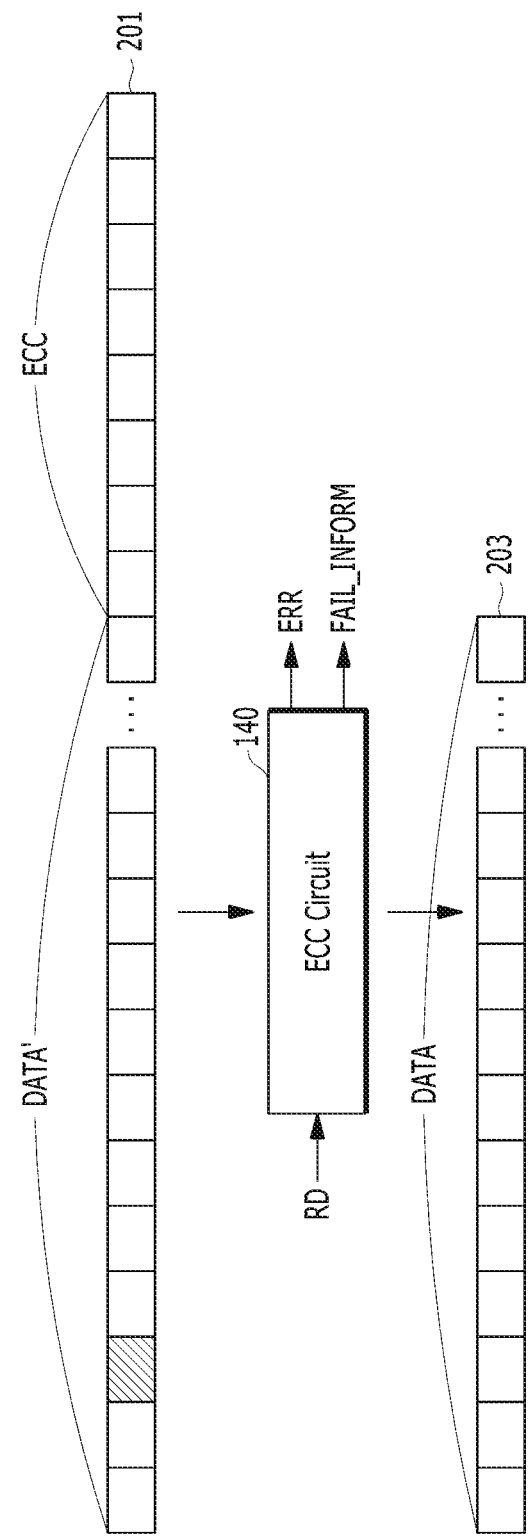
FIGS. 2 to 4 illustrate an operation of the memory device, in accordance with an embodiment of the present invention.

FIG. 2 illustrates a process of initially performing a read operation at a row address R_ADD of A and a column address C_ADD of 'B'. The read operation may be performed by applying the row address R_ADD of A and the column address C_ADD of B to the memory device 100 and applying a read command to the memory device 100.

First of all, the column circuit 130 may read a 128-bit data DATA' and an 8-bit error correction code (ECC) from memory cells corresponding to the row address R_ADD of A and the column address C_ADD of 'B' in the cell array 110. In FIG. 2, "201" represents the data DATA' and the error correction code ECC that are read by the column circuit 130. In FIG. 2 the shaded bit in the data DATA' illustrates an error bit.

The data DATA' and the error correction code that are read by the column circuit 130 may be transferred to the ECC circuit 140. The ECC circuit 140 may correct an error of the data DATA' through an error detection and correction operation and generate an error-corrected data DATA 203. It may be seen that the data DATA 203 is different from the data DATA' in that the error bit is corrected in the data DATA 203. The error-corrected data DATA 203 may be transferred to the memory controller. The ECC circuit 140 just corrects the error of the data DATA' 201 which is read by the column circuit 130, and then transfers the error-corrected data DATA 203 to the memory controller. The ECC circuit 140 and does not program the error-corrected data DATA 203 back into the memory cells. Therefore, the memory cells may still store the data DATA' 201 including the error bit.

During the error correction process of the ECC circuit 140, the information ERR on the error-corrected bit and information regarding the number of the bit order the error-corrected bit comes in the read data DATA' may be transferred to and stored in the data latch circuit 150. Also, the ECC circuit 140 may enable the failure information signal FAIL_INFORM to inform the address latch circuit 160 that the error is detected, and the address latch circuit 160 may store information that the row address R_ADD of A and the column address C_ADD of B are used for the read operation.

Figure 3:
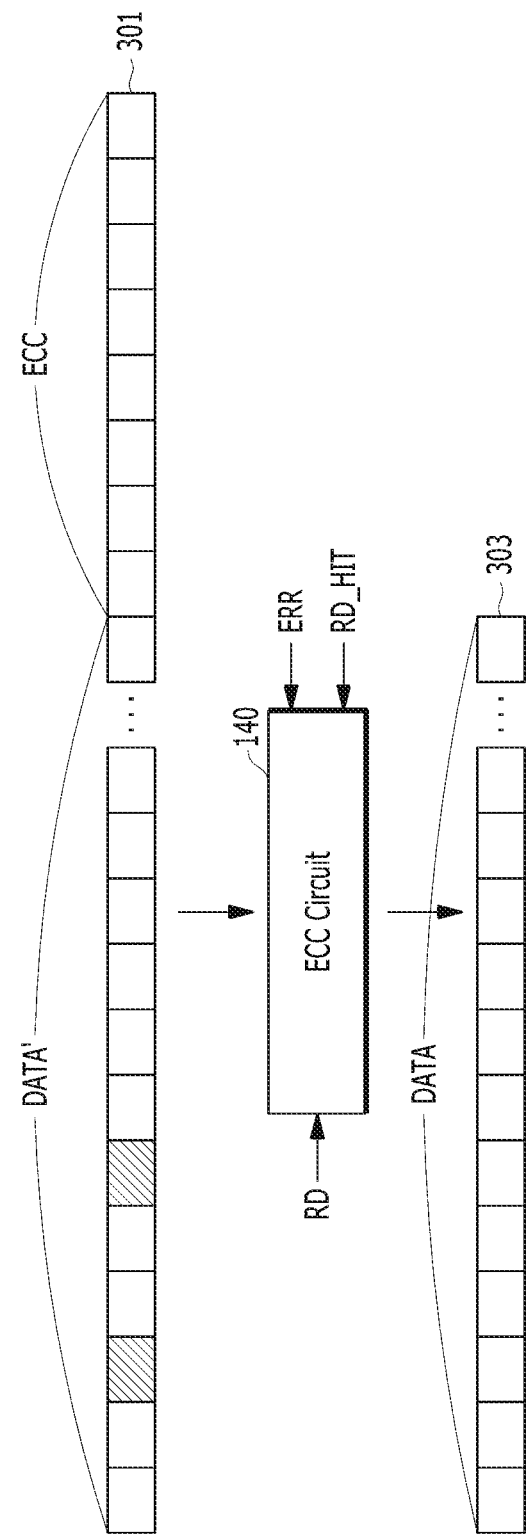

FIG. 3 illustrates a process of performing a read operation at a position of the row address R_ADD of A and the column address C_ADD of B. The read operation may be performed by applying the row address R_ADD of A and the column address C_ADD of B to the memory device 100 and applying a read command to the memory device 100.

First of all, the column circuit 130 may read a 128-bit data DATA' and an 8-bit error correction code from memory cells corresponding to the row address R_ADD of A and the column address C_ADD of B in the cell array 110. In FIG. 3, "301" represents the data DATA' and the error correction code ECC that are read by the column circuit 130. In FIG. 3, the shaded bits in the data DATA' represent error bits. Referring to the "301", it may be seen that the number of error bits in the data DATA' is increased by one from the number of error bits in the data DATA' in "201" of FIG. 2. The additional error bit may be an error bit that occurs sometime between the read operation of FIG. 2 and the read operation of FIG. 3.

The comparison circuit 170 may compare the row and column addresses R_C_ADD_LAT that are stored in the address latch circuit 160 with the row address R_ADD and the column address C_ADD that are used in the current read operation, and when the row and column addresses R_C_ADD_LAT are the same as the row address R_ADD and the column address C_ADD that are used in the current read operation, the comparison circuit 170 may enable the read hit signal RD_HIT.

The ECC circuit 140 may replace the error-corrected bit stored in the data latch circuit 150 with a bit at the same position in the read data DATA' 301 in response to the enabling of the read hit signal RD_HIT. To be specific, the ECC circuit 140 may replace the third bit of the read data DATA' 301 with the error-corrected bit stored in the data latch circuit 150. The ECC circuit 140 may generate the error-corrected data DATA 303 by performing an error correction operation. The error-corrected data DATA 303 may be transferred to the memory controller.

The ECC circuit 140 may be able to correct the two-bit error by replacing the error bit (i.e., the third bit) which is already corrected during the read operation of FIG. 2 with the error-corrected bit which is stored in the data latch circuit 150 to correct the error bit (i.e., the third bit) which is already corrected during the read operation of FIG. 2 and correcting the additional error bit (i.e., the sixth bit) that occurs additionally between the read operation of FIG. 2 and the read operation of FIG. 3 through an error correction operation. When the 128-bit data and the 8-bit error correction code are used, the ECC circuit 140 may be capable of correcting an error of only one bit. In this case, it is still possible to correct an error of two bits by storing the pre-detected error bit and then replacing another error bit with the stored error bit.

Although the error is detected and corrected by the ECC circuit 140 during the read operation of FIG. 3, new error information may not be stored in the data latch circuit 150 and the address latch circuit 160. This is because the data latch circuit 150 and the address latch circuit 160 are not initialized after the error information is stored in the data latch circuit 150 and the address latch circuit 160 during the read operation of FIG. 2.

Figure 4:
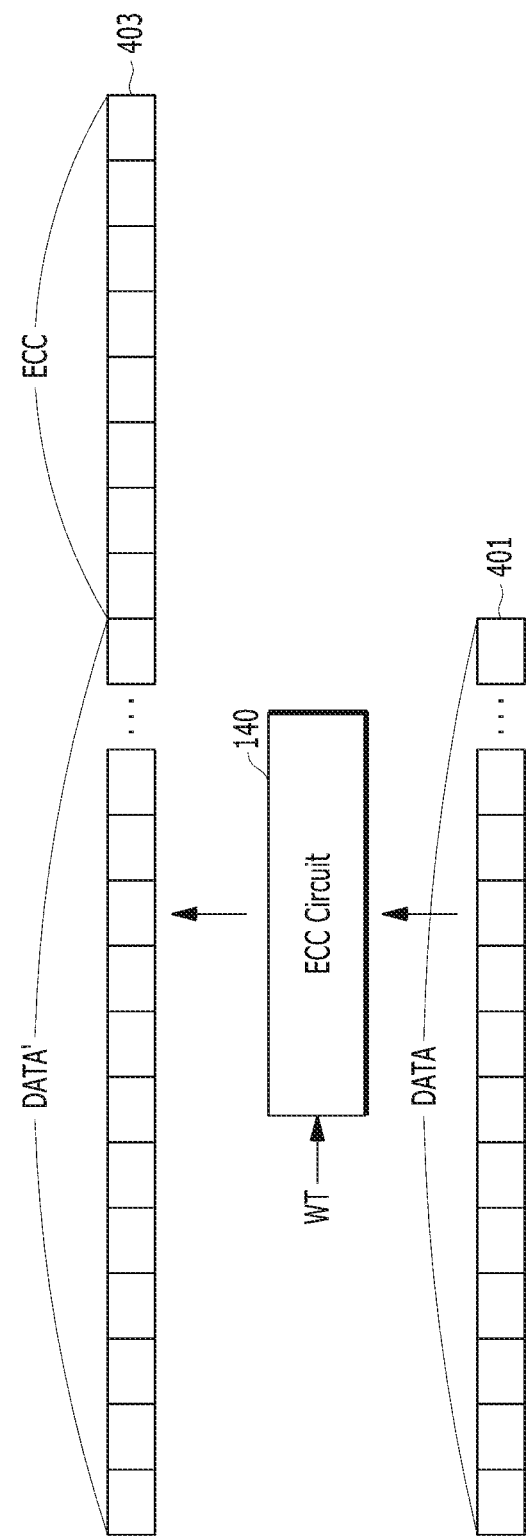

FIG. 4 illustrates a process of performing a write operation at a position of the row address R_ADD of A and the column address C_ADD of B after the read operation of FIG. 3. The write operation may be performed by applying the row address R_ADD of A and the column address C_ADD of B to the memory device 100 and applying a write command to the memory device 100.

First of all, a write data DATA 401 may be applied from the memory controller to the memory device 100.

The ECC circuit 140 may generate the error correction code based on the write data DATA 401, and transfer a data DATA' and the error correction code 403 which are to be programmed in the cell array 110 to the column circuit 130. Since the error correction operation is not performed during a write operation, the data DATA 401 and the data DATA' of 403 may be the same.

The comparison circuit 170 may compare the row and column addresses R_C_ADD_LAT that are stored in the address latch circuit 160 with the row address R_ADD and the column address C_ADD that are used in the current read operation, and when the row and column addresses R_C_ADD_LAT that are stored in the address latch circuit 160 are the same as the row address R_ADD and the column address C_ADD that are used in the current read operation, the comparison circuit 170 may enable the write hit signal WT_HIT.

Also, the data latch circuit 150 and the address latch circuit 160 may be initialized in response to the enabling of the write hit signal WT_HIT. This is because since the existing error is corrected by programming the new write data DATA' 403 in the memory cells storing the error bit in the cell array 110, the error information stored in the data latch circuit 150 and the address latch circuit 160 is not needed any more.

Although the above embodiment illustrates an example where there are one data latch circuit 150 and one address latch circuit 160, it is obvious to those skilled in the art that the data latch circuits 150 and the address latch circuit 160 may be provided in plural to replace error bits occurring in multiple regions of the cell array 110.

According to the embodiments of the present invention, the error correction efficiency of a memory device may be improved.

While the present invention has been described with respect to the specific embodiments, it will be apparent to those skilled in the art that various changes and modifications may be made without departing from the spirit and scope of the invention as defined in the following claims.

What is claimed is:

1. A method for operating a memory device, said method comprising:
   receiving a first read command and a first address;
   reading a first read data and a first error correction code from memory cells selected based on the first address;
   detecting and correcting an error of the first read data using the first error correction code;
   storing the first address as an error detection address in an address latch circuit;
   storing an error-corrected bit of the first read data and a position of the error-corrected bit of the first read data in a data latch circuit;
   transmitting an error-corrected first read data to an external device;
   receiving a second read command and a second address;
   reading a second read data and a second error correction code from memory cells that are selected based on the second address;
   comparing the second address with the error detection address;
   when the second address is the same as the error detection address, replacing a bit of the second read data which is positioned at the same position as the error-corrected bit of the first read data with the error-corrected bit of the first read data;
   correcting an error of the second address based on the second error correction code; and
   outputting an error-corrected second read data.

2. The method of claim 1, further comprising:
   receiving a first write command, a third address, and a first write data;
   comparing the third address with the error detection address;
   when the third address is the same as the error detection address, resetting the data latch circuit and the address latch circuit;
   generating a third error correction code based on the first write data; and
   programming the first write data and the third error correction code in memory cells that are selected based on the third address.

3. The method of claim 1, wherein the first address includes a first row address and a first column address, and the second address includes a second row address and a second column address.

4. The method of claim 2, wherein the first address includes a first row address and a first column address, and the third address includes a third row address and a third column address.

5. A memory device, comprising:
   an error correction circuit suitable for detecting and correcting an error of a read data based on an error correction code which is read during a read operation;
   a data latch circuit suitable for storing an error-corrected bit of the read data and a position of the error-corrected bit of the read data when an error is detected by the error correction circuit;
   an address latch circuit suitable for storing an address corresponding to the read data as an error detection address when the error is detected by the error correction circuit; and
   a comparison circuit suitable for comparing an external address with the error detection address,
   wherein when the external address is the same as the error detection address during the read operation, a bit of the read data read from memory cells corresponding to the external address, at the same position as the error-corrected bit stored in the data latch circuit, is replaced with the error-corrected bit.

6. The memory device of claim 5, wherein the error correction circuit generates an error correction code which is to be stored along with a write data based on the write data during a write operation.

7. The memory device of claim 6, wherein when the comparison circuit decides that the external address is the same as the error detection address during the write operation, the data latch circuit and the address latch circuit are reset.

8. The memory device of claim 7, wherein each of the external address and the error detection address includes a row address and a column address.

9. The memory device of claim 8, further comprising:
   a cell array including a plurality of memory cells, each coupled to a word line among a plurality of word lines and a bit line among a plurality of bit lines;
   a row circuit suitable for enabling a word line corresponding to an external row address among the word lines in response to a row active signal; and
   a column circuit suitable for reading the read data and the error correction code from memory cells corresponding to the enabled word line and bit lines corresponding to an external column address among the bit lines during a read operation, and during a write operation, programming the write data and the error correction code in memory cells corresponding to the enabled word line and the bit lines corresponding to the external column address among the bit lines.

10. The memory device of claim 9, wherein the row active signal is enabled during an active operation and disabled during a precharge operation.

\* \* \* \* \*